United States Patent [19]

Nakamura et al.

[11] Patent Number: 4,898,500
[45] Date of Patent: Feb. 6, 1990

[54] BALL END MILL WITH THROW AWAY INSERT

[75] Inventors: Naohiro Nakamura; Yoshikatsu Mori; Keiji Honda, all of Itami, Japan

[73] Assignee: Sumitomo Electric Industries, Ltd., Osaka, Japan

[21] Appl. No.: 245,178

[22] Filed: Sep. 16, 1988

[30] Foreign Application Priority Data

Sep. 17, 1987 [JP] Japan ............................ 62-143290[U]

[51] Int. Cl.⁴ ................................................. B23C 5/12
[52] U.S. Cl. ........................................ 407/62; 407/54; 407/34; 407/42
[58] Field of Search ....................... 407/34, 53, 54, 56, 407/57, 60, 61, 62, 64, 65, 42

[56] References Cited

U.S. PATENT DOCUMENTS

| | | | |
|---|---|---|---|
| 4,252,480 | 2/1981 | Mizuno | 407/54 |
| 4,618,296 | 10/1986 | Allaire | 407/42 |
| 4,699,549 | 10/1987 | Shimomura | 407/42 |

FOREIGN PATENT DOCUMENTS 111188  8/1979  Japan ..................................... 407/53
427800  5/1974  U.S.S.R. ............................... 407/53

Primary Examiner—Frederick R. Schmidt
Assistant Examiner—Blynn Shideler
Attorney, Agent, or Firm—Armstrong, Nikaido, Marmelstein, Kubovcik & Murray

[57] ABSTRACT

A ball end mill having a plurality of throw away inserts. Its body is formed in its hemispherical portion at diametrically opposite positions with insert mounting pockets each having a plurality of insert mounting seats. In each seat, an insert having an acruate cutting edge is mounted so that the cutting edges will generate a hemispherical locus with laps of more than a quarter of the length of each cutting edge. The inserts closer to the front end of the body has an axial rake of 0 to 5 degrees, whereas those at the rear have an axial rake of 4 to 8 degrees, the latter having a larger axial rake than that of the former. Further, the insert in each pocket are arranged so that the one at the rear will have the leading end of its cutting edge located on the extension line of the cutting edge of the one in front. Thus, the inserts as a whole form a substantially S-shaped line as viewed form the front of the body.

5 Claims, 4 Drawing Sheets

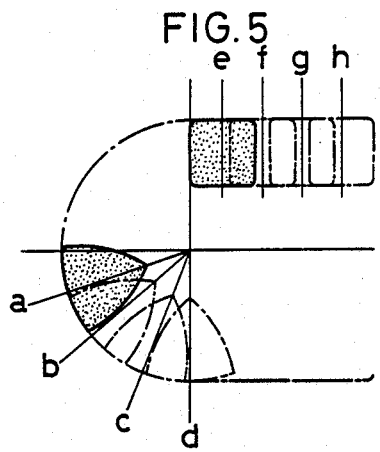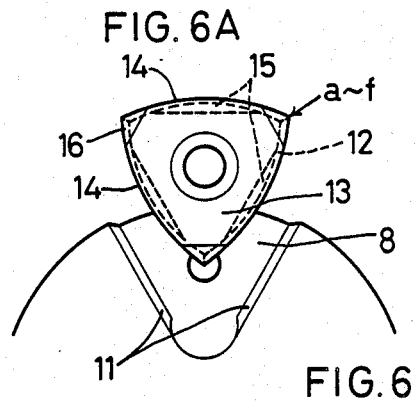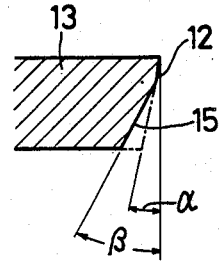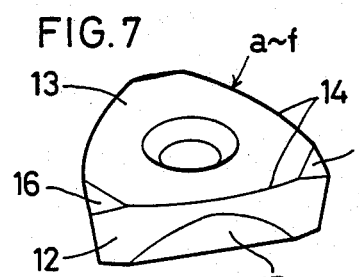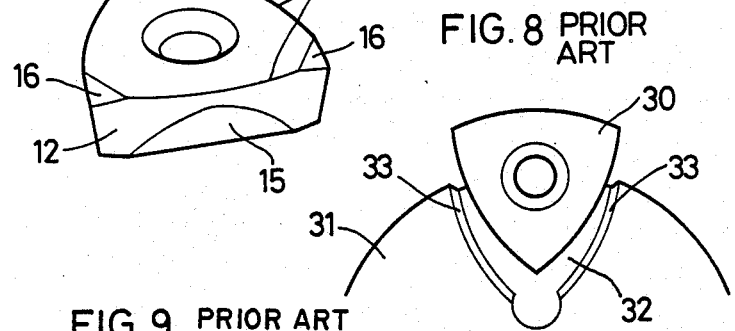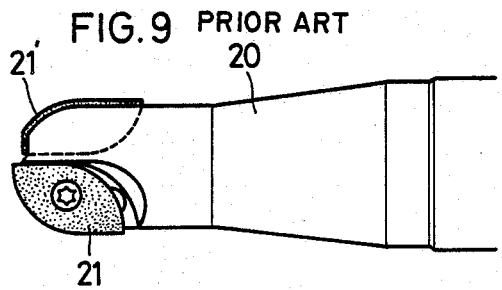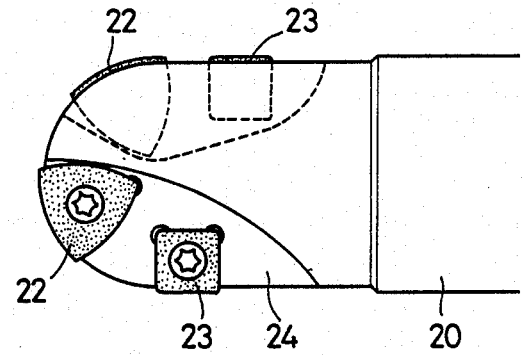

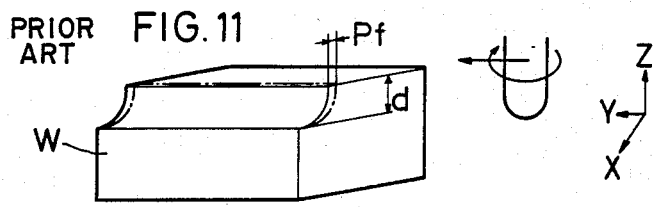
FIG. 11 PRIOR ART
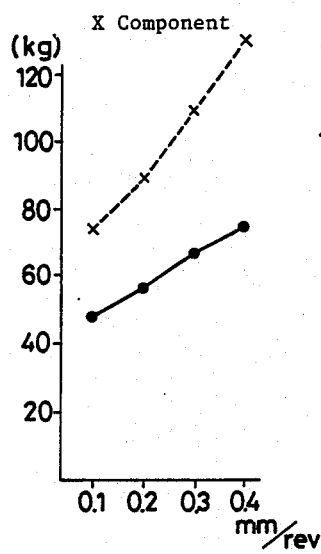
FIG. 12A X Component
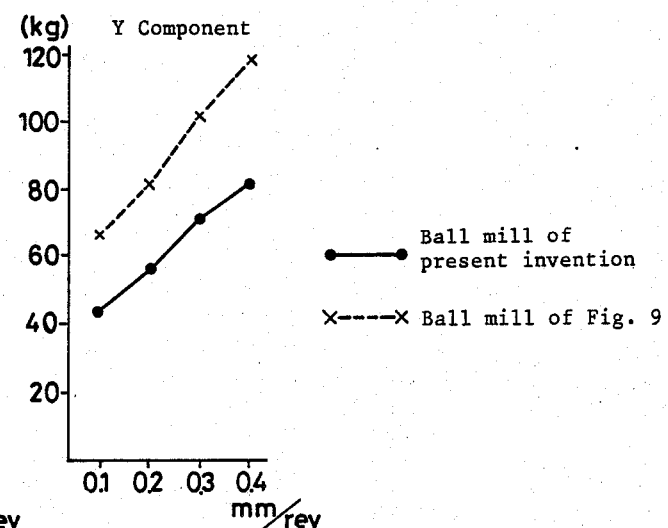
FIG. 12B Y Component
● — ● Ball mill of present invention
× - - - × Ball mill of Fig. 9
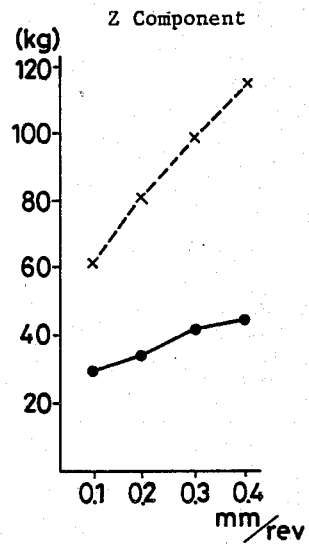
FIG. 12C Z Component
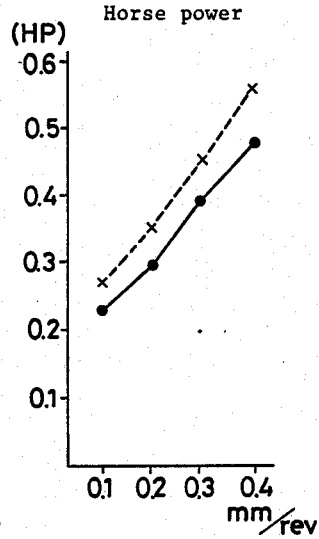
FIG. 12D Horse power

•——• Ball mill of present invention

×----× Ball mill of Fig. 13

BALL END MILL WITH THROW AWAY INSERT

The present invention relates to a ball end mill with a throw away insert suitable for high-speed heavy-load cutting with high precision.

FIG. 9 shows a prior art ball end mill having two throw away inserts 21, 21' mounted on the top portion of its body 20 at diametrically opposite positions, each throw away insert having both an arcuate cutting edge and a straight cutting edge. FIG. 10 shows another prior art tool provided at the top hemispherical portion of its body 20 with at least two throw away inserts 22 of a substantially regular triangular shape with its three sides forming arcuate cutting edges so that their locus will generate a hemisphere when rotated. Further, throw away inserts 23 having a straight cutting edge are mounted on the periphery of a cylindrical portion of the body. One similar to that shown in FIG. 10 but not provided with the straight-edged inserts 23 is disclosed in U.S. Pat. No. 4,252,480. Also known are one having arcuate-edged inserts mounted on the hemisperical top portion with positive axial rakes and one disclosed in Japanese Unexamined Patent Publication No. 61-81814 and having a plurality of throw away inserts mounted on the hemisperical top portion of the body so as to be arranged in steps in the direction of rotation.

With the ball end mill shown in FIG. 9, since each cutting insert has a long effective cutting edge, the cutting resistance is rather large. Such a tool will not be suited for use in high-speed heavy-load cutting because it tends to chatter during cutting.

With the tool shown in FIG. 10, each insert has a shorter effective cutting edge because of increased number of inserts. But since only two inserts are provided on the top hemispherical portion with a little overlap therebetween, each insert has to bear a rather large cutting load and is liable to produce wider chips. Thus, this tool has still much room for improvement as to the protection of the cutting edges and the reduction of cutting resistance. Further, as shown in the drawing, pockets 24 formed in the body so as to continuously extend from its top hemispherical portion to the straight portion will decrease the rigidity of the body substantially. Thus, this tool is not suited for heavy-load cutting, either.

With the tool having arcuate-edged throw away inserts mounted with axial rakes, the cutting edges bite into the work firstly at a point closest to the axis of rotation and as the tool turns, the length of the cutting edges in contact with the work gradually increases outwardly. This arrangement has an advantage of less shock upon initial contact with the work. But since the inserts are mounted with axial rakes, they are more liable to displacement. This will make it difficult for the inserts to generate an exact quarter-circular locus which is necessary for precise machining.

In this type, too, the same problem as in the other previously-mentioned prior art will be encountered that the smaller the number of inserts and the less the overlap therebetween, the larger the cutting load per cutting edge and the width of chips.

The tool disclosed in Japanese Publication No. 61-81814 has its inserts arranged in steps in the direction of rotation to give an equal radial rake with ease. This will improve their cutting ability.

The inventors of the present invention have found that improvement of the arrangement and shape of the inserts provide a ball end mill with high performance and high stability.

It is an object of the present invention to provide an ball end mill which obviates the abovesaid shortcomings.

An increased number of effective cutting edges are provided both on the hemispherical portion and the cylindrical portion so as to increase the overlaps between cutting edges. This will reduce the cutting load per cutting edge as well as the size of chips produced.

Further, since the inserts are inclined with predetermined axial rakes, not only can they bite into the work with a minimum of shock but also the length of cutting edges necessary to cut a given width area increases compared with a straight-edged insert. The cutting edges are thus protected effectively. Moreover, if the inserts are arranged with such axial rakes as to form a letter S as seen from the top of the body, the cutting edges can bite into the work one after another very smoothly and the length of cutting edges necessary to cut a given width area will further increase. Thus the cutting edges can be more effectively protected.

The larger the axial rake of each insert, the more its arcuate cutting edge appears to be a straight line as seen from the direction of rotation. However, according to the present invention, since an increased number of inserts are used, their cutting edges can form a nearly perfect quarter circular locus as viewed from the direction of rotation in spite of the fact that each insert has a rather large axial rake. This will be more easily understood if you recall the fact that the greater the number of sides and corners of a regular polygon, the more it looks like a circle.

Another advantage of providing inserts in a greater number is that each insert can be made smaller in size. This will make it possible to reduce the size of the chip pocket therefor, thus increasing the ridigidy of the body. If it is necessary to use straight-edged inserts, it is preferable to provide a chip pocket for each insert separately from one another in order to obtain high rigidity of the body.

The cutting edges should be arranged with laps of more than a quarter of the length of each cutting edge. Otherwise, not only will the cutting load on each insert increase remarkably but also the locus of the cutting edges will get out of shape.

The inserts mounted on the hemispherical portion should have such axial rakes as to form a letter S as viewed from the top of the body. But the axial rake of the inserts near the axis of the body should be no more than 5 degrees and that of the inserts provided rearwardly thereof should be no more than 8 degrees. Otherwise, the outline generated by the cutting edges will get out of shape.

The inserts for use in the present invention may have only one side thereof in the form of a cutting edge. But preferably, the inserts mounted on the hemispherical portion should be regular polygonal inserts having their sides all formed into arcuately cutting edges and the inserts mounted on the cylindrical portion of the body should be ordinary inserts of a regular polygonal shape, so that all sides of the inserts can be used for cutting.

Since the arcuate-edged regular polygonal positive inserts of the present invention are provided on each side face with a flat surface, they can be mounted on the respective insert seats so that the flat surfaces will be brought into close contact with the flat surfaces formed on the seats. Since the inserts can thus be held in a stable position without the fear of shifting, the work can be machined with high precision.

Further, each insert has its rake face chamferred at the corners thereof, so that the load on the cutting edges generated when the insert is initially brought into contact with the work will not concentrate on the leading end of each cutting edge. Thus, the inserts will be less liable to have broken cutting edges and the resistance during cutting will be reduced to a minimum.

Other features and objects of the present invent will become apparent from the following description taken with reference to the accompanying drawings, in which:

FIG. 5 is a schematic view showing the locus of the cutting edges;

FIG. 6A is a view of a throw away insert removed from seating face formed on the top hemispherical portion of the body;

FIG. 6B is a partial enlarged sectional view of the insert of FIG. 6A taken along a plane crossing one of its cutting edges at the central portion thereof;

FIG. 7 is a perspective view of an insert adapted to be mounted on the top hemispherical portion of the body;

FIG. 8 is a view of a prior art throw away insert being mounted on a ball end mill;

FIGS. 9 and 10 are side views of prior art ball end mills;

FIG. 11 is a view showing how a workpiece was machined in the performance test;

FIGS. 12A to 12D are graphs showing the results of the test;

Figure 1:
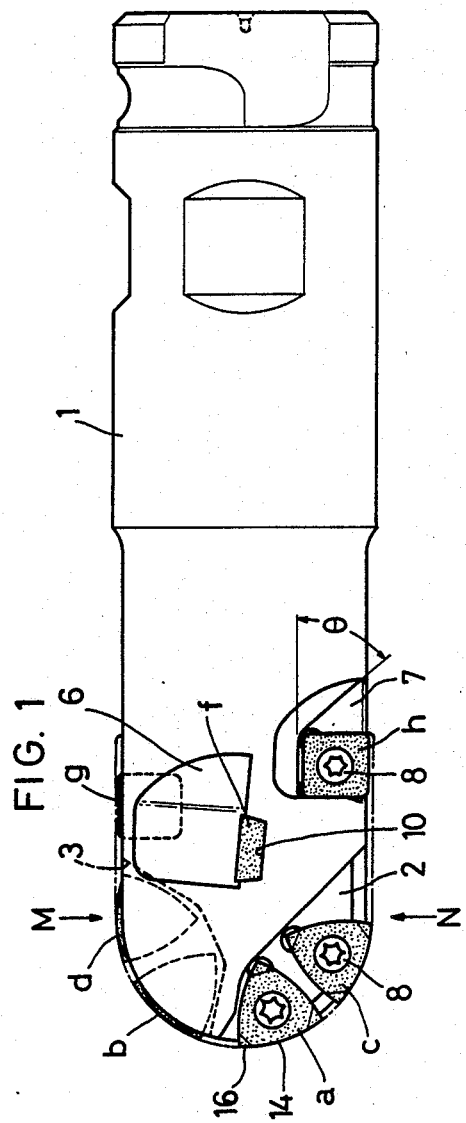
FIG. 1 is a side view of the ball end mill embodying the present invention.
Figure 4:
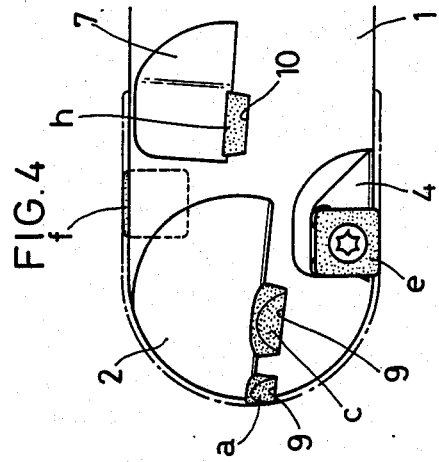
FIG. 4 is another plan view of the same as viewed from direction N in FIG. 1.
Figure 3:
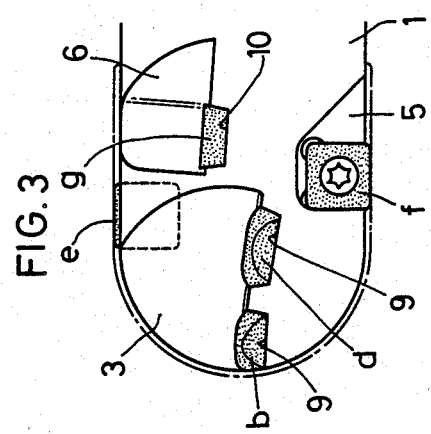
FIG. 3 is a plan view of the same as viewed from direction M in FIG. 1.

FIGS. 1 to 7 show an embodiment of the present invention in which a body 1 is formed in its top hemispherical portion at diametrically opposite positions with insert mounting pockets 2 and 3 and in the periphery of its cylindrical portion with insert mounting pockets 4 to 7 spaced axially and helically with an angular pitch of 90 degrees. Each of the pockets 2 and 3 is formed with a pair of insert seats 9 and each of the pockets 4 to 7 is formed with an insert seat 10.

Throw away inserts A to D and throw away inserts E to H are fixed in position in the seats 9 and the seats 10, respectively, by means of clamp screws 8.

The throw away inserts A to D are identical to one another. As shown in FIG. 6, each of them is of a positive type in which its three side surfaces 12 intersect the top surface 13 at an acute angle. Its cutting edges 14 form a substantially regular triangular shape with each edge arcuately curving with the same radius of curvature which is larger than that of the imaginary circle which circumscribes the insert at noses thereof.

Each side face 12 having a relief angle of $\alpha$ is formed with a flat surface 15 inclined with respect to the top surface 13 at a relief angle of $\beta$. As shown in FIG. 6B, the relief angle $\beta$ of the flat surface 15 should be larger than the relief angle $\alpha$, which is set within 0–15 degrees. The former should preferably be within the range of 10–30 degrees.

Each flat surface 15 should be formed so that its top end will be spaced from the cutting edges 14 at a suitable distance in order to insure that strength of the cutting edges and thus to prevent their arcuate edges from getting out of shape. (FIG. 7)

On the other hand, as shown in FIG. 6A, the end mill is formed on each insert mounting recess with a flat seating face 11 inclined at the same angle as that of the flat surfaces 15 of the insert.

The insert a–d is mounted on the end mill so that two of the three flat surfaces 15 formed on the side faces 12 will be brought into contact with the flat seating faces 11 on the mounting pocket 2 or 3. Since the insert thus makes surface-to-surface contact with the seating faces 11, the cutting force which acts on the insert will be stably received on the wide and flat areas, thus preventing the insert from moving during cutting.

A prior art throw away insert for use with a ball end mill or a radius end mill of a throw away type is disclosed in U.S. Pat. No. 4,252,480. This insert substantially regular triangular shape as viewed from top as shown in FIG. 8. Its cutting edges at three sides have the same convex arcuate shape so that their radius of curvature will be larger than that of an imaginary circle which circumscribes the insert at the noses thereof. Such inserts are mounted on an end mill 31 so that when the end mill is rotated about its axis, their cutting edges will generate a hemisphere having substantially the same radius of curvature as that of each cutting edge.

In order to stably mount the insert 30 on the end mill, each insert mounting recess 32 must have its seating faces arcuately shaped so as to conform to the shape of the sides of the insert. But mainly because of the difficulty in machining the inserts, the inserts tend to make point-to-point contact rather than surface-to-surface contact at their sides with the respective seating faces on the end mill. This will make it difficult to stably seat the inserts and thus to set them in a right position. Another problem resulting from the point-to-point contact is insufficient strength of the support.

Figure 2:
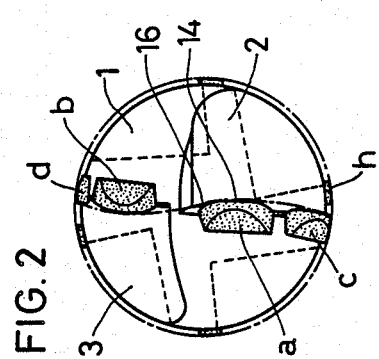
FIG. 2 is a front view of the same.

As shown in FIG. 5, the inserts A to D are arranged so that the locuses of their cutting edges 14 will overlap each other by more than a quarter of the length of each cutting edge 14 and will form a quarter circle. The inserts A and C are mounted in the insert mounting pocket 2 and the inserts B and D are mounted in the pocket 3 so that the inserts C and D will be located behind the inserts A and B, respectively. The inserts a and b are inclined with an axial rake of 2° while the inserts C and D with an axial rake of 5 The cutting edges of the inserts C and D have their leading ends placed on the extension lines from the cutting edges of the inserts a and b, respectively. With this arrangement, the line connecting the inserts A to D will take substantially the shape of a letter S as seen from the front of the tool, as shown in FIG. 2.

As shown in FIG. 7 at 16, the inserts A to D may have their rake face (upper surface 13) chamferred at the three corners thereof i.e. at the leading and trailing ends of each cutting edge 14 so as to be tapered rearwardly of the direction of rotation. However, they may not have their rake face chamferred. The inserts A to D may be of a substantially square shape having their four sides in the form of an arcuate cutting edge.

The straight-edged throw away inserts E to H may be mounted, if required, on the body in its respective pockets which are formed separately from one another so as not to lower the rigidity of the body. In order to minimize the cutting load on each cutting edge, the inserts should be arranged so that the locuses of their cutting edges will overlap each other by more than a quarter of the length of each cutting edge.

Each pocket 10 should preferably be tapered rearwardly and outwardly by an angle of $\theta=30\text{-}60°$ to discharge the chips smoothly. (FIG. 1)

The performance of the ball end mill according to the present invention was evaluated. The test results are shown below:

[TEST 1]

The ball end mill according to the present invention was tested in comparison with the prior art mill shown in FIG. 10, both having an outer diameter of 30 mm. Both tools we used to machine a workpiece shown in FIG. 11 under the following conditions.

Workpiece machined: Ordinary carbon steel (approx. 22 in HRC)
Machining speed (V): 80 m/min.
Number of revolutions (N): 850 rpm
Feed rate (f):
  0.1 mm/rev, 0.2 mm/rev,
  0.3 mm/rev, 0.4 mm/rev,
Depth of cut (d in FIG. 11): 25 mm
Pickfeed (Pf in FIG. 11): 1.0 mm FIGS. 12A to 12D show the three components of the cutting force and the required horse power which were obtained from Test 1.

[TEST 2]

Figure 13:
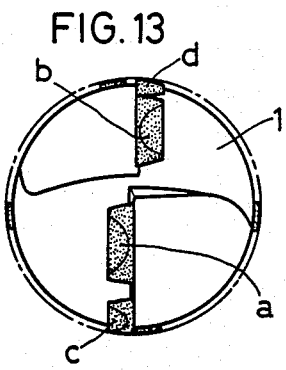
FIG. 13 is a front view of a tool used for comparison purposes in the other test showing the arrangement and shapes of its inserts.
Figure 14:
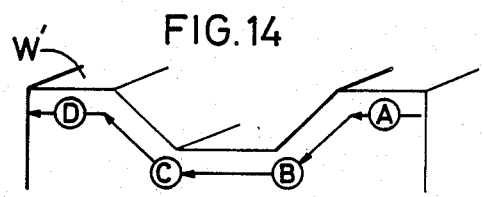
FIG. 14 is a view showing how a work was machined in the latter test.

A workpiece W' shown in FIG. 14 was machined by use of the ball end mill according to the present invention and the prior art tool shown in FIG. 13 (both having an outer diameter of 30 mm and a whole length of 145 mm). The workpiece was fed in the direction of arrows of FIG. 14 from A to D.

Figure 15A:
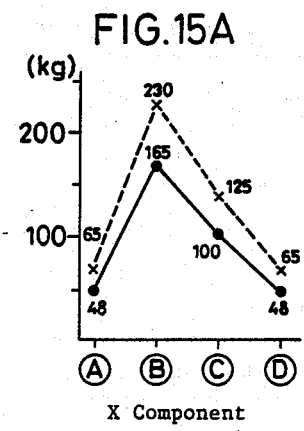
FIGS. 15A to 15C are graphs showing the results of the test.
Figure 15B:
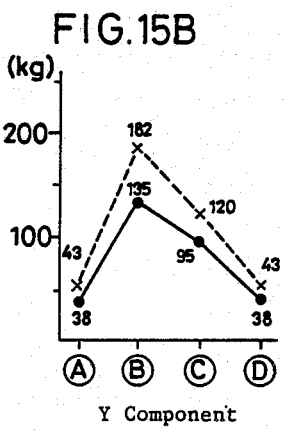
Figure 15C:
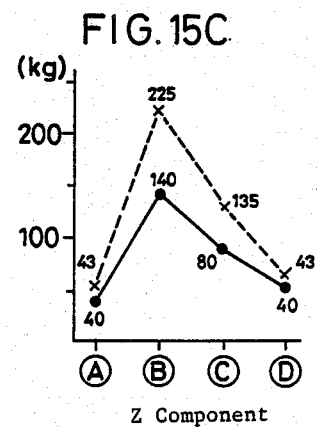

Machining was conducted under the following conditons:
Workpiece used: prehardened steel (40–42 in HRC)
V=60 m/min
f=0.15 mm/rev
Depth of cut: Ad=3 mm, Rd=4 mm FIGS. 15A to 15C show three components of the cutting force obtained from Test 2.

The prior art tool suffered breakage of a cutting edge at the central portion thereof during machining at the point B of FIG. 14. With the tool according to the present invention, no breakage of cutting edges occurred and the cutting resistance was small. The test results clearly show the advantages of arranging the cutting edges in an S-shape and providing the rearwardly chamferred surfaces at the ends of each cutting edge.

What is claimed is:

1. A ball end mill with throw away inserts, comprising a body formed in its hemispherical front end at diametrically opposite positions with two first insert mounting pockets, said pockets being formed each with a plurality of insert mounting seats, and first throw away inserts having an arcuate cutting edge and mounted in said respective insert mounting seats so that when said mill is rotated, the locuses of said cutting edges will generate a hemisphere and overlap by more than a quarter of the length of each cutting edge, the inserts closer to the front end of said body having an axial rake of 0–5 degrees and the inserts at the rear having an axial rake of 4–8 degrees, the latter inserts having a larger axial rake than the former, the latter insert in each pocket having the leading end of its cutting edge located on the extension line of the cutting edge of the former insert mounted in the same pocket, whereby said cutting edges form substantially an S-shaped line as viewed from the front of the body, said first inserts being of a substantially regular polygonal shape and of a positive type having their cutting edge arcuately convexed with a radius which is equal to one another and larger than that of the imaginary circle which circumscribes said each insert at the noses thereof, said inserts being formed on each side face thereof with a flat surface having a larger relief angle than that of the side face.

2. A ball end mill as claimed in claim 1, wherein said body is further formed in the periphery of its cylindrical portion integral with said hemispherical portion with a plurality of second insert mounting pockets each provided with an insert mounting seat and having their rear portion tapered obliquely and outwardly, said second pockets being arranged so as to be axially and circumferentially displaced from one another, and second inserts having a straight cutting edge are mounted in said respective second pocket so that the locuses of their cutting edges will overlap each other by more than a quarter of the length of each cutting edge.

3. A ball end mill as claimed in any of claims 1 and 2, wherein said first throw away inserts have their rake face chamferred at least at the leading end of the cutting edges thereof so as to be tapered rearwardly of the direction of rotation.

4. A ball end mill as claimed in any one of claims 1 or 2, wherein said insert mounting seat being formed with a flat seating surface so that the flat surfaces on said insert will be seated on the flat surfaces on said insert mounting seat.

5. A ball end mill as claimed in claim 4, wherein said first throw away inserts have their rake face chamferred at least at the leading end of the cutting edges thereof so as to be tapered rearwardly of the direction of rotation.

* * * * *

UNITED STATES PATENT AND TRADEMARK OFFICE
CERTIFICATE OF CORRECTION

PATENT NO. : 4,898,500
DATED : February 6, 1990
INVENTOR(S) : NAKAMURA et al

It is certified that error appears in the above-identified patent and that said Letters Patent is hereby corrected as shown below:

On the cover page, Item [75], "Keiji Honda" should read

--Keiji Handa--.

Signed and Sealed this

Twenty-eighth Day of May, 1991

*Attest:*

HARRY F. MANBECK, JR.

*Attesting Officer*      *Commissioner of Patents and Trademarks*